(12) United States Patent
Yang et al.

(10) Patent No.: US 10,063,131 B2
(45) Date of Patent: Aug. 28, 2018

(54) SECONDARY-SIDE CONTROL CIRCUIT, CONTROL METHOD AND FLYBACK CONVERTER THEREOF

(71) Applicant: Silergy Semiconductor Technology (Hangzhou) LTD, Hangzhou, ZheJiang Province (CN)

(72) Inventors: Xiaoyu Yang, Hangzhou (CN); Zhiliang Hu, Hangzhou (CN); Yongjiang Bai, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/601,782

(22) Filed: May 22, 2017

(65) Prior Publication Data

US 2017/0353099 A1    Dec. 7, 2017

(30) Foreign Application Priority Data

Jun. 1, 2016 (CN) .......................... 2016 1 0379160

(51) Int. Cl.
| | |
|---|---|
| *H02M 3/335* | (2006.01) |
| *H02M 1/08* | (2006.01) |
| *H02M 3/28* | (2006.01) |
| *H02M 7/155* | (2006.01) |
| *H02M 1/00* | (2006.01) |

(52) U.S. Cl.
CPC .............. *H02M 1/08* (2013.01); *H02M 3/285* (2013.01); *H02M 3/33507* (2013.01); *H02M 7/1557* (2013.01); *H02M 3/33576* (2013.01); *H02M 3/33592* (2013.01); *H02M 2001/0003* (2013.01)

(58) Field of Classification Search
CPC ........... H02M 2001/0003; H02M 1/08; H02M 7/155; H02M 7/1555; H02M 7/1557; H02M 3/285; H02M 3/335; H02M 3/33507; H02M 3/33523; H02M 3/3353; H02M 3/33576; H02M 3/33592; H02M 3/337

See application file for complete search history.

(56) References Cited

U.S. PATENT DOCUMENTS

| | | | |
|---|---|---|---|
| 8,885,364 B2 | 11/2014 | Wang et al. | |
| 9,130,468 B2 | 9/2015 | Xu | |
| 9,246,394 B2 | 1/2016 | Deng | |
| 9,331,588 B2 | 5/2016 | Chen | |
| 9,564,815 B2 | 2/2017 | Huang et al. | |
| 2004/0125621 A1* | 7/2004 | Yang ................. | H02M 3/33592 363/21.14 |
| 2009/0058389 A1* | 3/2009 | Yang ................. | H02M 3/33507 323/301 |

(Continued)

*Primary Examiner* — Emily P Pham
*Assistant Examiner* — Shahzeb K Ahmad
(74) *Attorney, Agent, or Firm* — Michael C. Stephens, Jr.

(57) ABSTRACT

A method of controlling a secondary-side rectifier switch of a flyback converter, can include: detecting a slope parameter of a secondary-side detection voltage along a predetermined direction, where the secondary-side detection voltage is configured to represent a voltage across a secondary winding of the flyback converter; and controlling the secondary-side rectifier switch to turn on when the slope parameter is greater than a slope parameter threshold, and a relationship between the secondary-side detection voltage and the ON threshold meets a predetermined requirement.

16 Claims, 10 Drawing Sheets

(56) References Cited

U.S. PATENT DOCUMENTS

| | | | |
|---|---|---|---|
| 2014/0003096 A1* | 1/2014 | Deng | H02M 3/33592 363/21.14 |
| 2014/0078788 A1* | 3/2014 | Yao | H02M 3/33592 363/21.14 |
| 2014/0334205 A1* | 11/2014 | Zhang | H02M 1/4266 363/89 |
| 2016/0172962 A1 | 6/2016 | Chen et al. | |
| 2016/0233779 A1* | 8/2016 | Cohen | H02M 3/33592 |
| 2016/0373019 A1* | 12/2016 | Hsu | H02M 3/33592 |
| 2017/0317598 A1* | 11/2017 | Ptacek | H02M 3/33523 |

\* cited by examiner

US 10,063,131 B2

SECONDARY-SIDE CONTROL CIRCUIT, CONTROL METHOD AND FLYBACK CONVERTER THEREOF

RELATED APPLICATIONS

This application claims the benefit of Chinese Patent Application No. 201610379160.0, filed on Jun. 1, 2016, which is incorporated herein by reference in its entirety.

FIELD OF THE INVENTION

The present invention generally relates to the field of power electronics, and more particularly to secondary-side control circuits and methods, and associated flyback converters.

BACKGROUND

Switch mode power supplies can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Flyback converters have characteristics of relatively high conversion efficiency, and relatively low power losses. A typical primary-controlled flyback converter regulates an output voltage or an output current by controlling a main power switch at the primary-side of the transformer. In addition, at the secondary side of the flyback converter, a rectifier switch may be used to replace a diode, in order to significantly reduce rectifier power losses, and to improve conversion efficiency.

Figure 1:
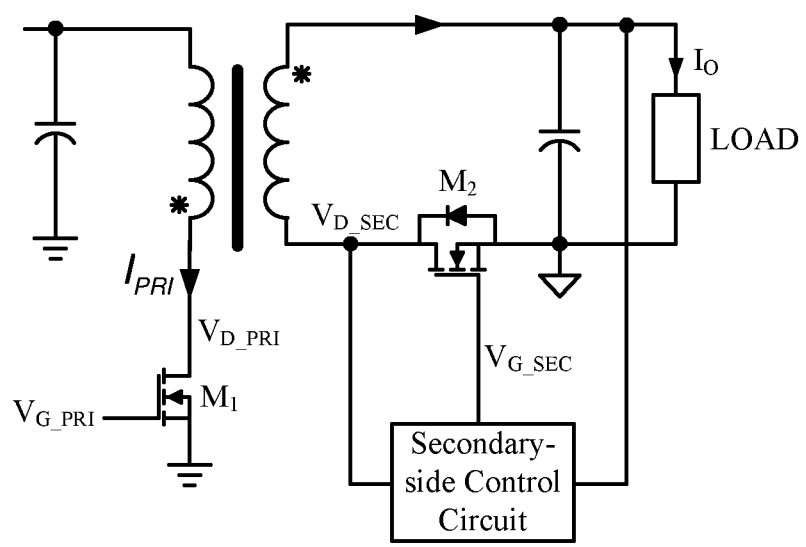
FIG. 1 is a schematic block diagram of an example flyback converter using synchronous rectification technology.
Figure 2:
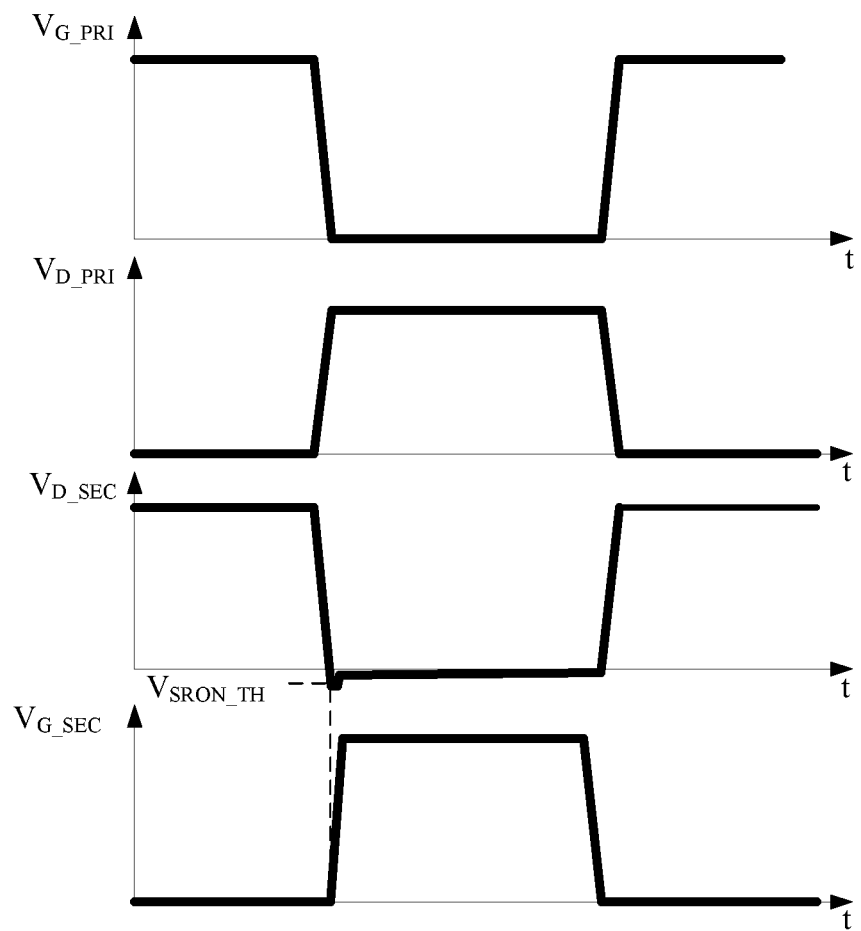
FIG. 2 is a waveform diagram of example operation of the flyback converter of FIG. 1 in a continuous conduction mode.

Referring now to FIG. 1, shown is a schematic block diagram of an example flyback converter using synchronous rectification technology. Also referring to FIG. 2, which shows a waveform diagram of example operation of the flyback converter of FIG. 1 in a continuous conduction mode. After main power switch $M_1$ is turned off based on control signal $V_{G\_PRI}$, drain voltage $V_{D\_PRI}$ of main power switch $M_1$ may rise. The energy stored in a transformer can start to be transferred to the secondary side, and a body diode of secondary-side rectifier switch $M_2$ may be firstly be turned on. Thus, voltage $V_{D\_SEC}$ at a common node of secondary-side rectifier switch $M_2$ and a secondary winding may be negative due to the voltage drop across the body diode. When voltage $V_{D\_SEC}$ is lower than ON threshold value $V_{SRON\_TH}$ (e.g., slightly lower than zero, such as about −50 mV), the secondary-side rectifier switch can be controlled to turn on according to control signal $V_{G\_SEC}$.

Figure 3:
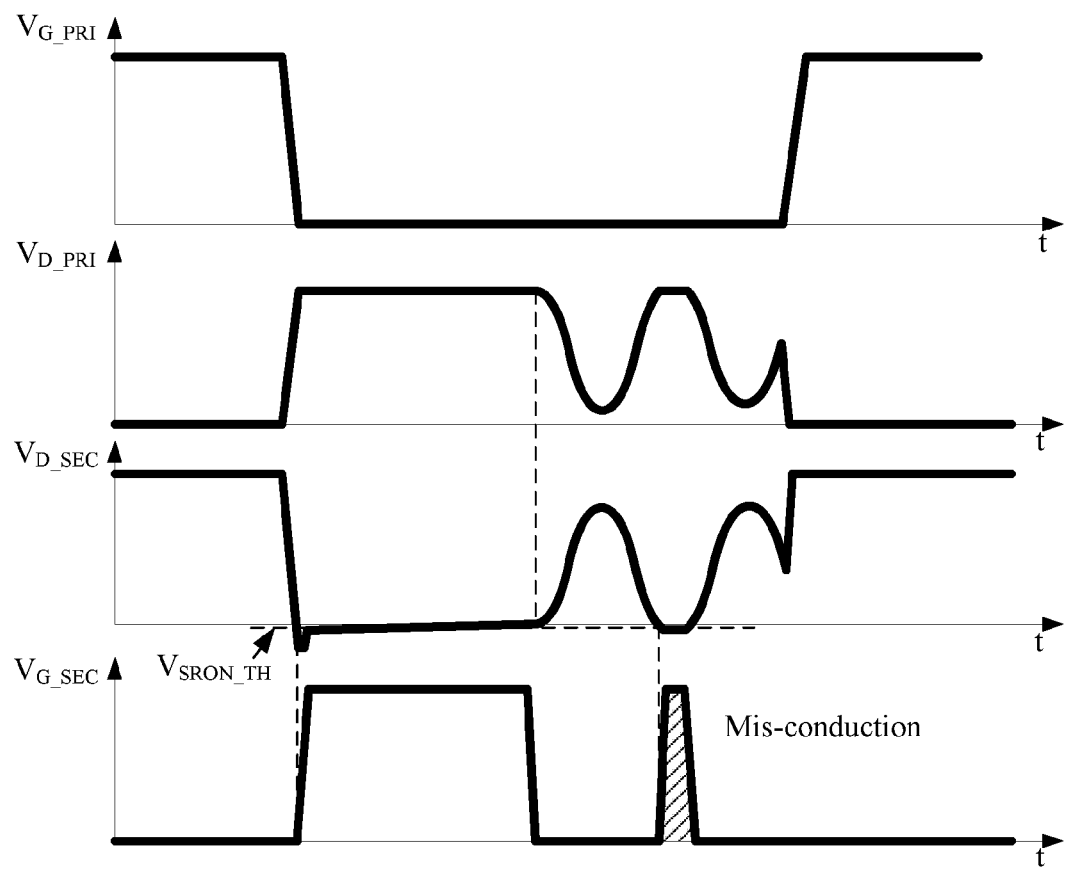
FIG. 3 is a waveform diagram of example operation of the flyback converter of FIG. 1 in a discontinuous conduction mode.

Referring now to FIG. 3, shown is a waveform diagram of example operation of the flyback converter of FIG. 1 in a discontinuous conduction mode. However, when the flyback converter operates in a discontinuous conduction mode, in each switching cycle, when the energy stored in the transformer is fully transferred to the secondary side, a voltage across a primary winding may resonate due to the existence of the parasitic parameters prior to the main power switch at the primary side being turned on. The voltage resonance may be transferred to the secondary side through the transformer, and voltage $V_{D\_SEC}$ can accordingly resonate. If the resonance amplitude is relatively large, voltage $V_{D\_SEC}$ may be decayed to be lower than ON threshold value $V_{SRON\_TH}$ during the resonance period, and this condition may "mislead" secondary-side rectifier switch $M_2$ to be turned on.

When a main power switch at the primary side of a flyback converter is turned off, a voltage across a secondary winding may fall at a relatively high rate. When resonance occurs at the primary side, the voltage across the secondary winding may fall at a relatively low rate. Voltage $V_{D\_SEC}$ can be used to represent the voltage across the secondary winding before the secondary-side rectifier switch is turned on. In particular embodiments, the voltage drop across the secondary winding that is caused by the turn off of the main power switch or the resonance that occurs after the energy stored in the transformer is released can be determined. Thus, the secondary-side rectifier switch may be precisely controlled according to the fall rate of the voltage across the secondary winding.

In order to detect the fall slope of the voltage across the secondary winding, secondary-side detection voltage $V_{D\_SEC}$ across the secondary winding may be detected. Secondary-side detection voltage $V_{D\_SEC}$ can be detected during the change period from threshold value $V_{D\_HTH}$ to threshold value $V_{D\_HTH}$. When secondary-side detection voltage $V_{D\_SEC}$ is decayed to be lower than threshold value $V_{D\_HTH}$, timing can begin, and when $V_{D\_SEC}$ is decayed to be lower than $V_{D\_HTH}$, such timing can complete. For example, the change period can be denoted by $\Delta T$, so the equivalent fall slope of the voltage across the secondary winding can be calculated as shown below in Equation (1).

$$k = V_{D\_HTH} - V_{D\_LTH}/\Delta T \qquad (1)$$

It can be seen that fall period $\Delta T$ is in inverse proportion to the fall slope, so $\Delta T$ can be used as the basis of the secondary-side control. The fall rate may be higher when $\Delta T$ is shorter, and may be lower when $\Delta T$ is longer. Generally, when the main power switch at the primary side is turned off, the fall slope of the voltage across the secondary winding is several times the fall slop in the resonance state. Correspondingly, the fall time of the voltage across the secondary winding in the resonance state may be several times the fall time when the main power switch at the primary side is turned off. By comparing the fall time (change period) against a time threshold, the voltage drop across the secondary winding that is caused by resonance can be determined. Also for example, this can be determined by detecting fall amplitude $\Delta V$ in predetermined period $\Delta Tc$ when secondary-side detection voltage $V_{D\_SEC}$ starts falling to be lower than a given threshold value. Thus, the equivalent fall slope of the voltage across the secondary winding can be calculated as shown below in Equation (2).

$$k = \Delta V / \Delta Tc \qquad (2)$$

It can be seen that the fall amplitude is in direct proportion to the fall slope, and may be used as the basis of the secondary-side control. By comparing the fall time (change period) against an amplitude threshold, the voltage drop across the secondary winding that is caused by resonance can be determined.

In one embodiment, a method of controlling a secondary-side rectifier switch of a flyback converter, can include: (i) detecting a slope parameter of a secondary-side detection voltage along a predetermined direction, where the secondary-side detection voltage is configured to represent a voltage across a secondary winding of the flyback converter; and (ii) controlling the secondary-side rectifier switch to turn on when the slope parameter is greater than a slope parameter threshold, and a relationship between the secondary-side detection voltage and the ON threshold meets a predetermined requirement.

Figure 4:
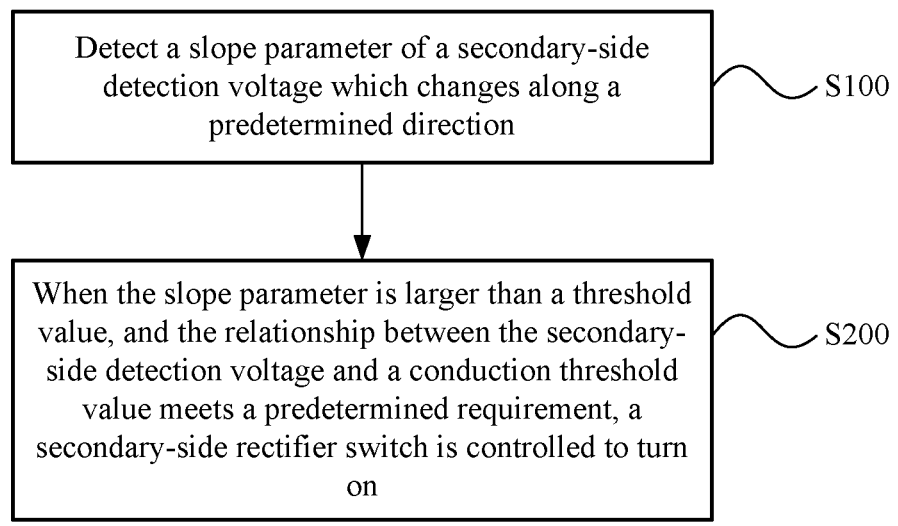
FIG. 4 is a flow diagram of an example secondary-side control method for a flyback converter, in accordance with embodiments of the present invention.

Referring now to FIG. 4, shown is a flow diagram of an example secondary-side control method for a flyback converter, in accordance with embodiments of the present invention. In this example, "mis-conduction" or the turning on/off of the secondary-side rectifier switch at times that may cause substantial residence, can be substantially avoided. At S100, a slope parameter of the secondary-side detection voltage that changes along a predetermined direction can be detected. The secondary-side detection voltage may represent a voltage across the secondary winding of the flyback converter. The secondary-side detection voltage may be in in direct or inverse proportion to the voltage across the secondary winding. In one example, the secondary-side detection voltage utilizes drain voltage $V_{D\_SEC}$ of a secondary-side rectifier switch. Also, the slope parameter can be a change amplitude of the secondary-side detection voltage during a predetermined time, and the threshold value of the slope parameter can be the threshold value of the amplitude.

For example, the slope parameter may be the change time during which the secondary-side detection voltage changes from a first threshold value to a second threshold value, and the threshold value of the slope parameter is the threshold value of the fall time. When the secondary-side detection voltage uses drain voltage $V_{D\_SEC}$ of the secondary-side rectifier switch, the change time can be the actual fall time, and the first threshold value may be greater than the second threshold value. In other cases, a voltage detected at other positions of the secondary-side circuit can be used as the secondary-side detection voltage. When the secondary-side detection voltage changes in an inverse direction with respect to the voltage across the secondary winding, the change time may be the rise time, and the first threshold value can be less than the second threshold value.

At S200, when the slope parameter is greater than the threshold value, and the relationship between the secondary-side detection voltage and the conduction threshold value meets a predetermined requirement, the secondary-side rectifier switch can be controlled to turn on. For example, the change threshold value that represents the threshold value of the fall time is an amplification signal N times the previous valid change time signal, where N is greater than 1 but less than 5 (e.g., greater than 2 and less than 3, such as N=2.5). The previous valid change time signal may be a change time signal which that is previously detected and used to turn on the secondary-side rectifier switch when in an active state, and the change time signal is used to represent the change time.

For example, when the secondary-side detection voltage uses drain voltage $V_{D\_SEC}$ of the secondary-side rectifier switch, the initial value of the change threshold may be obtained according to the change time signal corresponding to that the freewheeling time being greater than a reference time. For example, the freewheeling time is a time interval during which the drain voltage of the transistor is less than the freewheeling threshold. The following describes exemplary circuit configurations that utilize control based on the detection of the change time.

In one embodiment, a control circuit for controlling a secondary-side rectifier switch of a flyback converter, can include: (i) a slope parameter detection circuit configured to detect a slope parameter of a secondary-side detection voltage along a predetermined direction, and to generate a slope detection signal that represents the slope parameter, where the secondary-side detection voltage is configured to represent a voltage across a secondary winding of the flyback converter; and (ii) a switch control signal generator configured to generate a switching control signal to control the secondary-side rectifier switch to turn on when the slope detection signal is greater than a slope parameter threshold, and a relationship between the secondary-side detection voltage and an ON threshold value meets a predetermined requirement.

Figure 5:
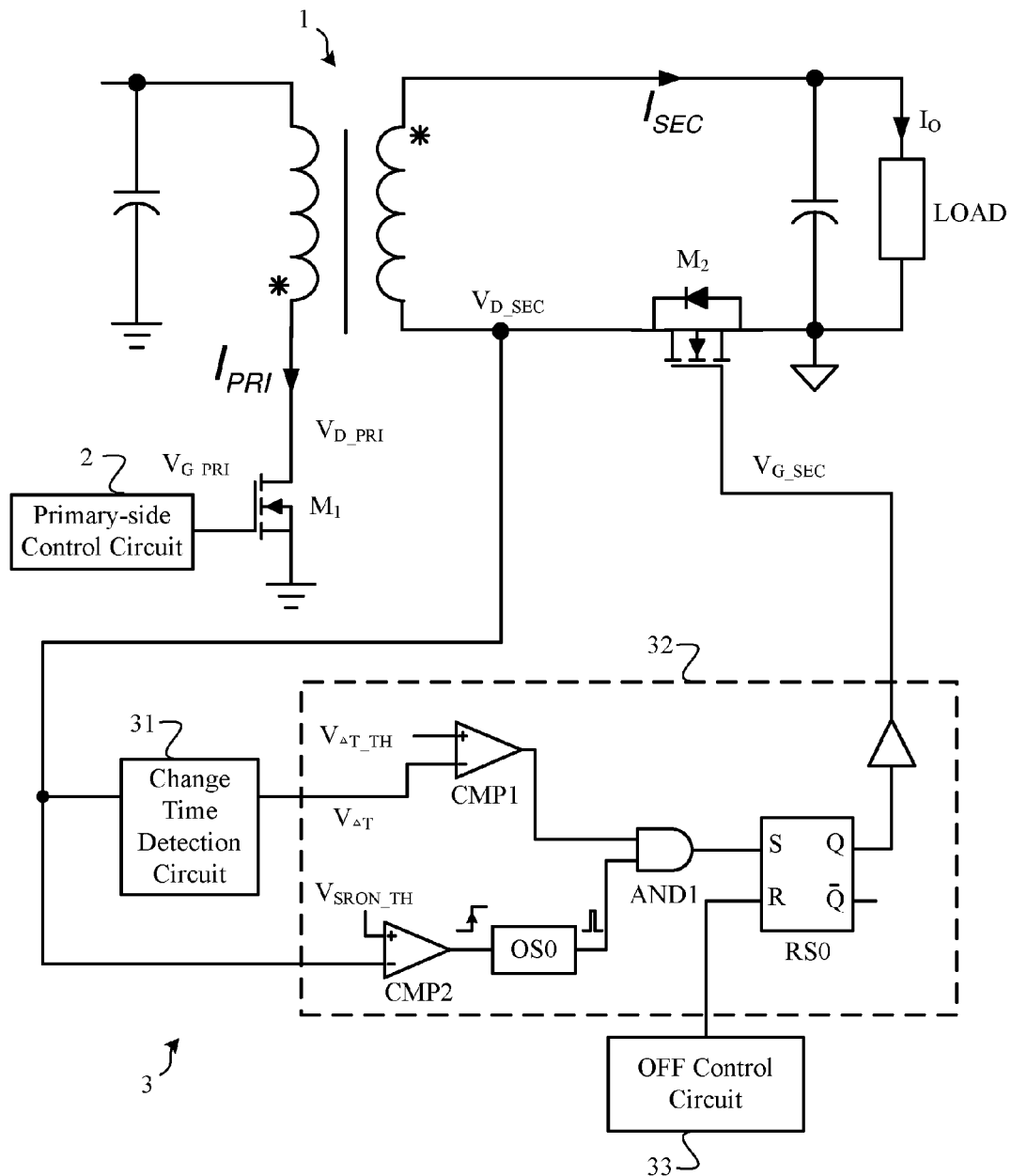
FIG. 5 is a schematic block diagram of an example flyback converter, in accordance with embodiments of the present invention.

Referring now to FIG. 5, shown is a schematic block diagram of an example flyback converter, in accordance with embodiments of the present invention. In this particular example, the flyback converter can include power stage circuit 1, primary-side control circuit 2, and secondary-side control circuit 3. Power stage circuit 1 can include primary winding $L_1$, secondary winding $L_2$, main power switch $M_1$ coupled between the primary winding and ground, and secondary-side rectifier switch $M_2$ coupled between secondary winding $L_2$ and ground. Both of main power switch $M_1$ and secondary-side rectifier switch $M_2$ can be any suitable controllable electrical switch devices (e.g., metal oxide field effect transistors [MOSFET], bipolar junction transistors [BJT], etc.). Primary-side control circuit 2 can control the switching operation of main power switch $M_1$. Primary-side control circuit 2 may be implemented by any suitable circuit structure. Secondary-side rectifier switch 3 can control the switching operation of secondary-side rectifier switch $M_2$, in order to realize synchronous rectification, and to output a stable voltage or current to a load.

Secondary-side control circuit 3 can include change time detection circuit 31 and switch control signal generator 32. In this particular example, drain voltage $V_{D\_SEC}$ of secondary-side rectifier switch $M_2$ is taken as an example to represent the secondary-side detection voltage, because drain voltage $V_{D\_SEC}$ can represent the voltage across the secondary winding when secondary-side rectifier switch $M_2$ is turned off. Change time detection circuit 31 can be used to obtain the change time signal $V_{AT}$. Change time signal $V_{AT}$ may represent change time ΔT during which secondary-side detection voltage $V_{D\_SEC}$ changes from threshold value $V_{D\_HTH}$ to threshold value $V_{D\_LTH}$. It can be seen that change time signal $V_{AT}$ is proportional to change time ΔT.

When change time ΔT represented by change time signal $V_{AT}$ is less than fall time threshold ΔT_TH corresponding to change threshold $V_{AT\_TH}$, and the relationship of secondary-side detection voltage $V_{D\_SEC}$ and ON threshold value $V_{SRON\_TH}$ meets a predetermined requirement, switch control signal generator 32 can activate a switching control signal to turn on secondary-side rectifier switch $M_2$. In this particular example, the predetermined requirement for the relationship between secondary-side detection voltage $V_{D\_SEC}$ and ON threshold value $V_{SRON\_TH}$ can indicate that secondary-side detection voltage $V_{D\_SEC}$ is decayed to be lower than ON threshold value $V_{SRON\_TH}$. For example, change time signal $V_{AT}$ is in direct proportion to change time ΔT. Thus, the relationship between change time ΔT and fall time threshold ΔT_TH can be determined by determining if change voltage signal $V_{AT}$ is less than change threshold value $V_{AT\_TH}$.

For example, switch control signal generator 32 can generate the switching control signal to turn off secondary-side rectifier switch $M_2$ according to a reset pulse signal generated by OFF control circuit 33. OFF control circuit 33 can be implemented by any suitable circuitry. It can be seen that, when the voltage change amplitude in a predetermined time is used as the slope parameter, the change time detection circuit may be replaced by a change amplitude detection circuit, and the switch control signal generator can compare the change amplitude and the amplitude threshold value, and may trigger the secondary-side rectifier switch to turn on when the change amplitude is greater than the amplitude threshold value, and the relationship between secondary-side detection voltage $V_{D\_SEC}$ and ON threshold value $V_{SRON\_TH}$ meets a predetermined requirement.

Thus, the slope parameter of the secondary-side detection voltage along a predetermined direction can be detected by the slope parameter detection circuit (e.g., change time detection circuit or change amplitude detection circuit), in order to obtain the slope detection signal to represent the slope parameter. Then, the switch control signal generator may generate the switching control signal in order to turn on the secondary-side rectifier switch in a case when the slope parameter represented by the slope detection signal is greater than the slope parameter threshold, and the relationship between the secondary-side detection voltage and the ON threshold value meets the predetermined requirement. In such a manner, whether the voltage drop of the secondary winding is caused by the turn off of the main power switch at the primary side can effectively be distinguished from the voltage drop of the secondary winding being due to the parasitic parameters, in order to avoid mis-conduction of the secondary-side rectifier switch.

For example, change time detection circuit 31 can include a timing and reset circuit and a signal conversion circuit. The timing and reset circuit can activate control signal V1 when secondary-side detection voltage $V_{D\_SEC}$ changes from threshold value $V_{D\_HTH}$ to threshold value $V_{D\_LTH}$, and may activate control signal V2 when the secondary-side detection voltage is less than threshold value $V_{D\_LTH}$ but greater than threshold value $V_{D\_HTH}$. Control signal V1 can control the signal conversion circuit for timing the active duration of control signal V1, and the valid duration is the change time interval. Control signal V2 may reset the signal conversion circuit whereby change time signal $V_{AT}$ is reset to the initial value (e.g., zero). After ending the timing and before reset, the signal conversion circuit may maintain change time signal $V_{AT}$ obtained by timing.

The time point for resetting the signal conversion circuit may have a plurality of choices. For example, the reset can occur when the secondary-side detection voltage is less than threshold value $V_{D\_LTH}$ (i.e., the timing ends) for a predetermined delay. In another example, the reset can occur when secondary-side detection voltage $V_{D\_SEC}$ rises to be greater than threshold value $V_{D\_LTH}$ again, or rises to be greater than threshold value $V_{D\_HTH}$. The purpose of reset is to guarantee the accuracy of subsequent timing, and to prevent the next timing result from being affected by the previous timing result. Thus, reset can be carried out when the secondary-side detection voltage $V_{D\_SEC}$ falls to threshold value $V_{D\_HTH}$ again and before the next timing is started. The signal conversion circuit can generate a voltage signal that is proportional to the valid time of control signal V1 as change time signal $V_{AT}$, and may reset the voltage signal according to the valid pulses of control signal V2.

Figure 6:
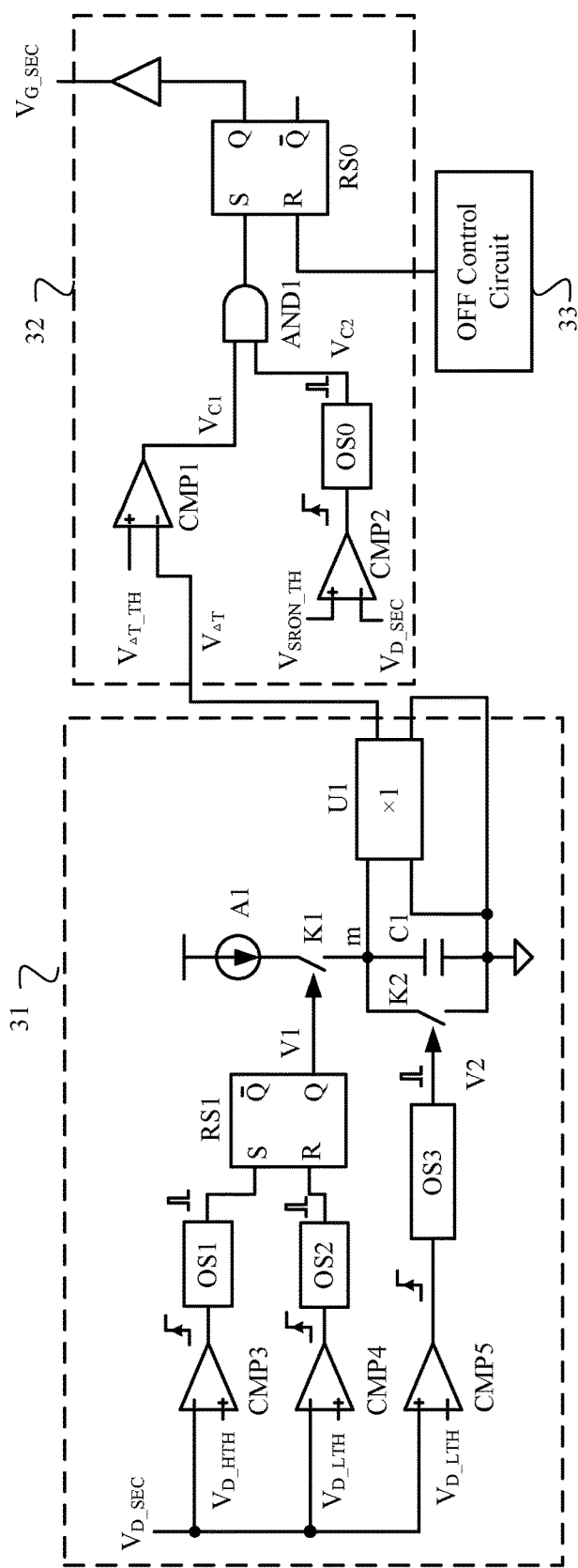
FIG. 6 is a schematic block diagram of an example secondary-side control circuit, in accordance with embodiments of the present invention.

Referring now to FIG. 6, shown is a schematic block diagram of an example secondary-side control circuit, in accordance with embodiments of the present invention. In this example, the timing and reset circuit of change time detection circuit 31 can include comparators CMP3-CMP5, pulse generators OS1-OS3, and RS flip-flop RS1. Comparator CMP3 can compare secondary-side detection voltage $V_{D\_SEC}$ against threshold value $V_{D\_HTH}$, and may generate a high level when secondary-side detection voltage $V_{D\_SEC}$ is lower than threshold value $V_{D\_HTH}$. Comparator CMP4 can compare threshold value $V_{D\_LTH}$ against secondary-side detection voltage $V_{D\_SEC}$, and may output a high level when secondary-side detection voltage $V_{D\_SEC}$ is lower than threshold value $V_{D\_LTH}$. Pulse generator OS1 can connect to an output terminal of comparator CMP3, and may provide triggering pulses in respond to the rising edges (triggering edges) of the comparison signal. Pulse generator OS2 can connect to an output terminal of comparator CMP4, and may provide triggering pulses in response to the rising edges (triggering edges) of the comparison signal. RS trigger RS1 may have a set terminal coupled to pulse generator OS1, a reset terminal coupled to pulse generator OS2, and an output terminal for providing control signal V1.

When secondary-side detection voltage $V_{D\_SEC}$ falls to be lower than threshold value $V_{D\_HTH}$, comparator CMP3 can output a comparison signal with a rising edge. Pulse generator OS1 can output a triggering pulse in response to the rising edge of the comparison signal, so as to set RS flip-flop RS1, and control signal V1 may be activated (e.g., at a high level). When secondary-side detection voltage $V_{D\_SEC}$ continuously falls to be lower than threshold value $V_{D\_LTH}$, comparator CMP4 can output a comparison signal with a rising edge. Pulse generator OS2 may generate a triggering pulse in response to the rising edge of the comparison signal, so as to reset RS flip-flop RS1, and control signal V1 may be deactivated (e.g., go low). In this way, the change time during which secondary-side detection voltage $V_{D\_SEC}$ changes from threshold value $V_{D\_HTH}$ to threshold value $V_{D\_LTH}$ can be timed, and control signal V1 can effectively characterize the change time interval.

In addition, comparator CMP5 can compare threshold value $V_{D\_LTH}$ against secondary-side detection voltage $V_{D\_SEC}$, and may output a high level when secondary-side detection voltage $V_{D\_SEC}$ is lower than threshold value $V_{D\_LTH}$. Pulse generator OS3 can connect to comparator CMP5, and may output control signal V2 in the form of pulses in response to the rising edge of the output signal of comparator CMP5 (e.g., in response to the case that secondary-side detection voltage $V_{D\_SEC}$ rises to be greater than threshold value $V_{D\_LTH}$). In this way, the signal conversion circuit may be reset when secondary-side detection voltage $V_{D\_SEC}$ rises to be greater than threshold value $V_{D\_LTH}$. One skilled in the art will recognize that pulse generator OS2 can have different inputs when the reset timings are different, and the triggering edges of pulse generator OS2 can be different on the basis of different valid/active levels.

The signal conversion circuit can include current source A1, control switch K1, capacitor C1, control switch K2, and voltage controlled current source U1. Current source A1 and control switch K1 can connect in series between a supply terminal and an intermediate terminal "m." Control switch K1 may be controlled by control signal V1. Capacitor C1 and control switch K2 can connect in parallel between intermediate terminal "m" and ground. Control switch K2 may be controlled by control signal V2. Voltage controlled current source U may generate an output voltage as change time signal $V_{ΔT}$, and the output voltage can be proportional to a voltage across capacitor C1. When control signal V1 is active, control switch K1 may be turned on, control switch K2 can be turned off, and current source A1 may charge capacitor C1. The voltage across capacitor C1 may linearly rise along with the duration time in which control signal V1 is active. When control signal V1 is deactivated, control switch K1 can be turned off, control switch K2 may be turned off, and the voltage across capacitor C1 remains unchanged. When control signal V2 is activated, control signal K2 can be turned on such that capacitor C1 is discharged, and the voltage across capacitor C1 can be reset to zero. A voltage at intermediate terminal "m" (e.g., the voltage across capacitor C1) may be replicated as change time signal VΔT at the output terminal steadily by voltage controlled current source U1.

As also shown in FIG. 5, switch control signal generator 32 can include comparator CMP1, comparator CMP2, and logic circuit LG. Comparator CMP1 can compare change threshold value $V_{ΔT\_TH}$ against change time signal $V_{ΔT}$, and may generate comparison signal $V_{C1}$. Comparator CMP2 can compare ON threshold $V_{SRON\_TH}$ against secondary-side detection voltage $V_{D\_SEC}$, and may generate comparison signal $V_{C2}$. Logic circuit LG may provide the switching control signal to turn on the secondary-side rectifier switch in a case that comparison signal $V_{C1}$ indicates change time signal $V_{ΔT}$ is less than change threshold value $V_{ΔT\_TH}$, and comparison signal $V_{C2}$ indicates secondary-side detection voltage $V_{D\_SEC}$ is less than ON threshold value $V_{SRON\_TH}$. For example, change threshold value $V_{ΔT\_TH}$ may be a predetermined voltage value provided externally or by a voltage source.

Logic circuit LG can include pulse generator OS0, AND-gate AND1, and RS flip-flop RS0. Pulse generator OS0 can connect to comparator CMP2, and may generate a pulse with a predetermined width in response to the rising edge of comparison signal $V_{C2}$ (e.g., when secondary-side detection voltage $V_{D\_SEC}$ is less than ON threshold value $V_{SRON\_TH}$). Pulse and comparison signal $V_{C1}$ generated by comparator CMP1 may be provided to AND-gate AND1. The output terminal of AND-gate AND1 can connect to the set terminal of RS flip-flop RS0. Because comparison signal $V_{C1}$ can represent the relationship between change time signal $V_{ΔT}$ and change threshold value $V_{ΔT\_TH}$, when the voltage across the secondary winding falls due to the turn off of main power switch M1 at the primary side, ΔT<ΔT_TH, and change time signal $V_{ΔT}$ is less than the change threshold value $V_{ΔT\_TH}$, comparison signal $V_{C1}$ may be at a high level.

When secondary-side detection voltage $V_{D\_SEC}$ is less than ON threshold value $V_{SRON\_TH}$, pulse generator OS0 can generate one pulse. AND-gate AND1 may output a set pulse when both of comparison signal $V_{C1}$ and the pulse are active, so as to set RS flip-flop RS0, and may generate switching control signal $V_{G\_SEC}$ to turn on secondary-side rectifier switch M2. When the voltage across the secondary winding falls due to the resonance at the primary side, ΔT>ΔT_TH, thus change time signal $V_{ΔT}$ is greater than change threshold value $V_{ΔT\_TH}$, comparison signal $V_{C1}$ may be low. Secondary-side detection voltage $V_{D\_SEC}$ can fall to be less than ON threshold value $V_{SRON\_TH}$ due to the relatively large resonance amplitude at the secondary side. RS flip-flop RS0 may not operate since comparison signal $V_{C1}$ can be maintained at the low level, and AND-gate AND1 can output a low level, in order to avoid mis-conduction of switching control signal $V_{G\_SEC}$.

Those skilled in the art will recognize that the connection relationship between the logic circuit and the comparator in FIGS. 5 and 6 is only one exemplary arrangement, and various circuit structures employing different logic circuit types, valid signal levels, and connection relationships between the logic circuits and comparators, can alternatively be used in certain embodiments. In addition, OFF control circuit 33 can provide a reset pulse to reset terminal R of RS flip-flop RS0 in logic circuit LG, such that switching control signal $V_{G\_SEC}$ is switched to indicate OFF.

In the present example, by using the characteristic that the voltage across the secondary winding fluctuates slowly during the resonance period, the change time signal indicating the change time of the secondary-side detection voltage can be compared against the change threshold value. Only when the change time of the secondary-side detection voltage is relatively small (e.g., the change rate is relatively high and the slope is relatively large), the secondary-side rectifier switch may be allowed to turn on when the secondary-side detection voltage is less than the ON threshold value, thereby distinguishing whether the voltage drop of the secondary winding is due to the turn off of the main power switch at the primary side or due to parasitic parameters, in order to substantially avoid mis-conduction of the secondary-side rectifier switch.

Figure 7:
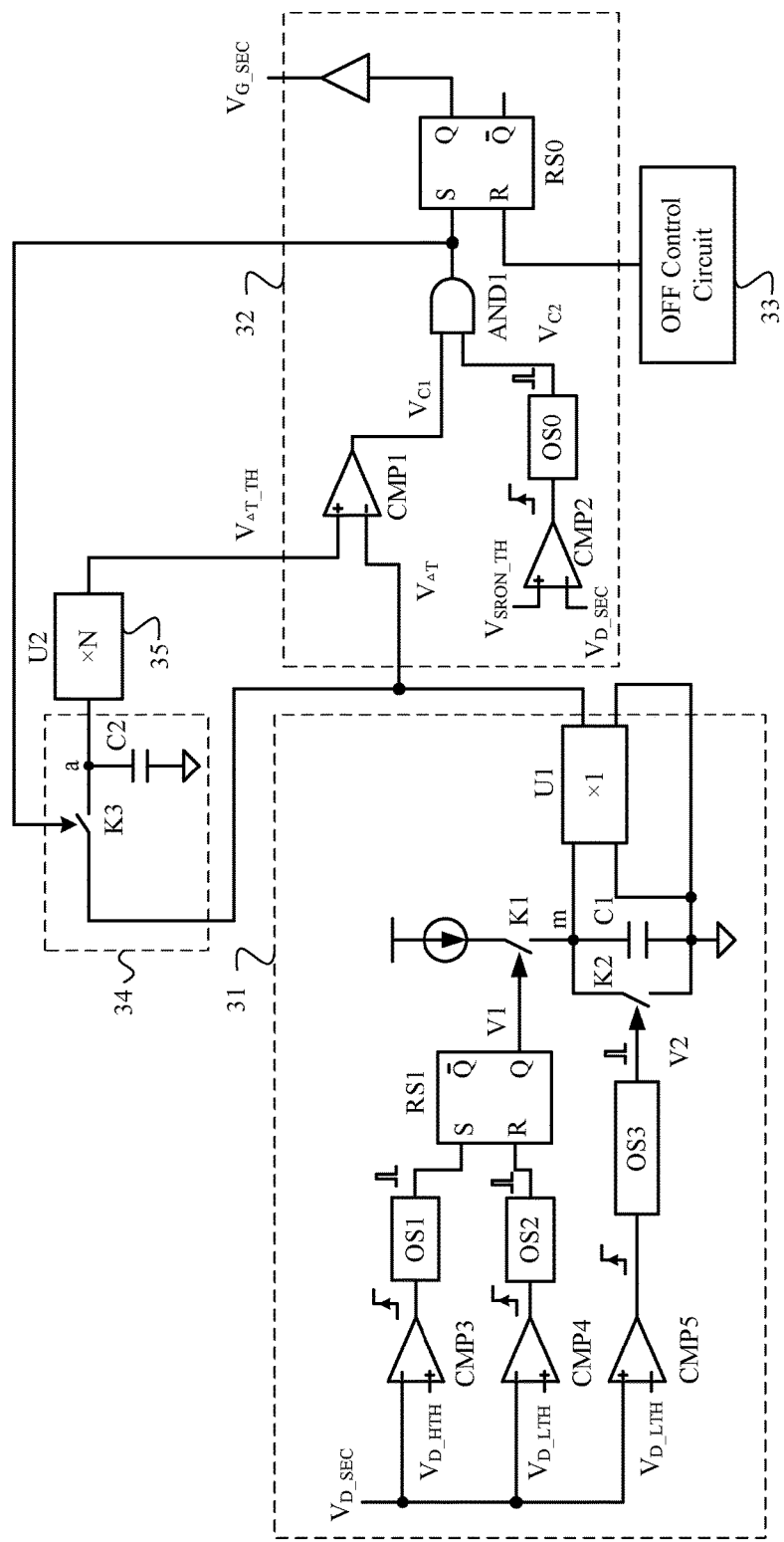
FIG. 7 is a schematic block diagram of another example secondary-side control circuit, in accordance with embodiments of the present invention.

Referring now to FIG. 7, shown is a schematic block diagram of another example secondary-side control circuit, in accordance with embodiments of the present invention. In this example, the secondary-side control circuit can also include latch circuit 34 and gain circuit 35 in addition to change time detection circuit 31 and switch control signal generator 32. Here, change threshold value $V_{AT\_TH}$ indicating the fall time threshold value can be latched and updated dynamically. In this particular example, the change threshold value is an amplification signal N times the previous valid change time signal, and N is greater than 1 but less than 5 (e.g., N is greater than 2 and less than 3, such as N=2.5). The previous valid change time signal is a change time signal previously detected and used to turn on the secondary-side rectifier switch when active.

Latch circuit 34 can be coupled to change time detection circuit 31 for latching the previous valid change time signal. For example, latch circuit 34 can include capacitor C2 and control switch K3, and capacitor C2 can connect between an output terminal of latch circuit 34 and ground. Control switch K3 can connect between terminal "a" of latch circuit 34 and the output terminal of change time detection circuit 31, and can be controlled to turn on for a predetermined time when secondary-side rectifier switch M2 is switched from OFF to ON, such that the change time signal is transferred to capacitor C2 for storage. The control signal of control switch K3 can be a rising edge trigger signal of switching control signal $V_{G\_SEC}$ of secondary-side rectifier switch M2. The control signal can be generated by a pulse trigger, or may be obtained from the signal at set terminal S of RS flip-flop RS1 in logic circuit LG.

When RS flip-flop RS1 is set and switching control signal $V_{G\_SEC}$ is switched to a high level, control switch K3 can be controlled to turn on for a predetermined time, such that the voltage across capacitor C2 is updated to new change time signal $V_{AT}$. Because switching control signal $V_{G\_SEC}$ is switched to a high level, latched change time signal $V_{AT}$ is a previous valid change time signal for the next voltage drop of the secondary winding. Gain circuit 35 can connect to latch circuit 34 for providing an amplification signal N times the latched signal of the latch circuit. That is to say, the latched signal of the latch circuit may be amplified by N times, and the latched signal can be a voltage signal. For example, gain circuit 35 can be implemented by voltage controlled voltage source U2. Change time signal $V_{AT}$ may be amplified by several times through gain circuit 35, and maintained in a reasonable range.

Thus in particular embodiments, the change threshold value may self-regulate with the change of the circuit, which makes the secondary-side control circuit more accurate and timely than a secondary-side control circuit with a fixed threshold value. Also, since the latched signal is updated in real time, it is possible to prevent the change threshold value from being inaccurate due to the charge loss of the capacitor. When the flyback converter is powered up, the change threshold value typically needs an initial value for turning on secondary-side rectifier switch M2 for the first time period in this example, the initial value can be set according to the change time signal that is obtained by a latch operation after the flyback converter is powered up for predetermined time $T_{SR\_BLANK}$. Before the flyback converter is powered up, the secondary-side control circuit may only receive the change time signal but not latch it. In this particular example, time $T_{SR\_BLANK}$ can be set as a fixed value, and may be generated by a delay circuit.

Figure 8:
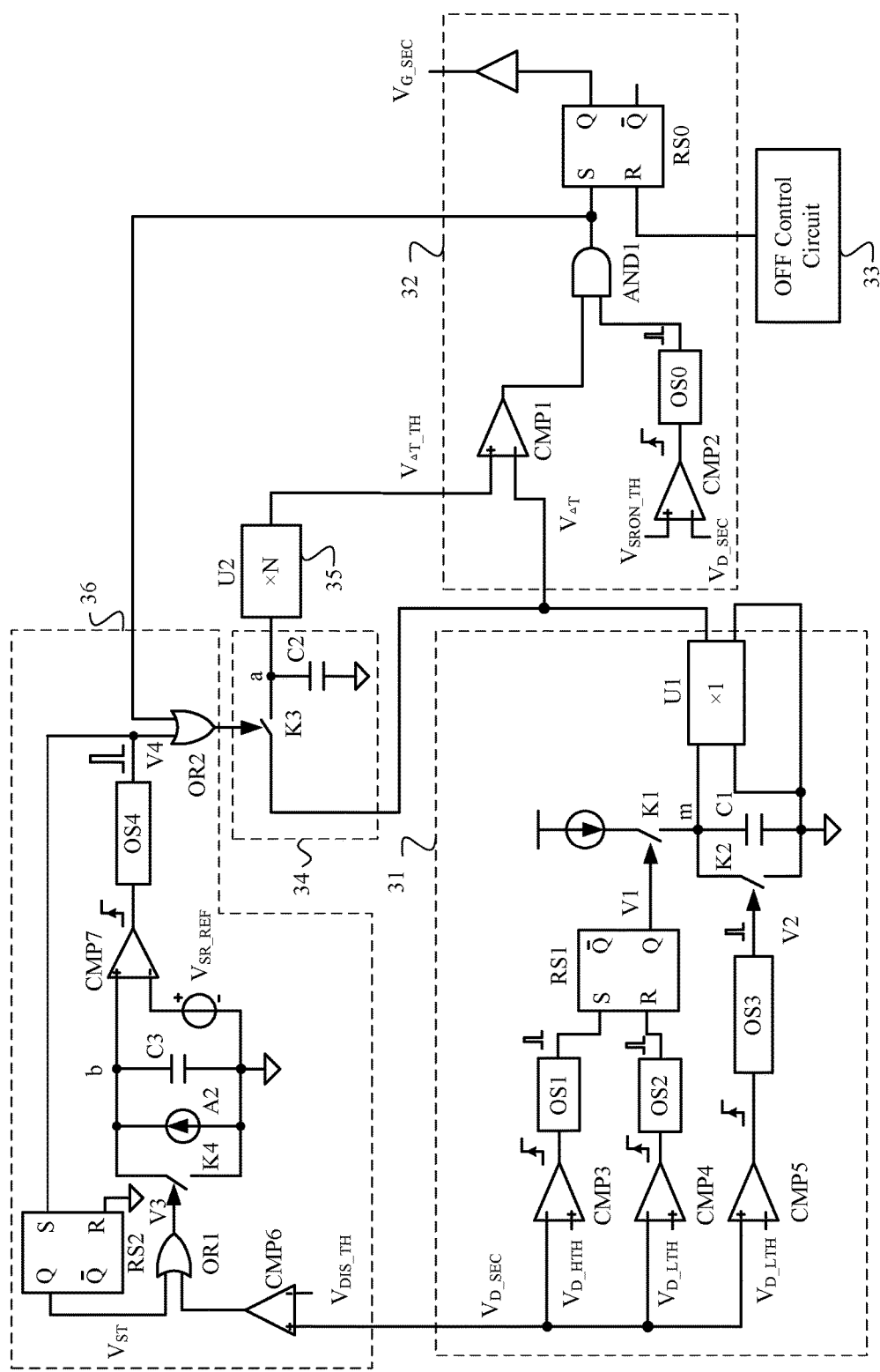
FIG. 8 is a schematic block diagram of yet another example secondary-side control circuit, in accordance with embodiments of the present invention.

Referring now to FIG. 8, shown is a schematic block diagram of yet another example secondary-side control circuit, in accordance with embodiments of the present invention. In this particular example, the secondary-side control circuit can also include latch control circuit 36 in addition to change time detection circuit 31, switch control signal generator 32, latch circuit 34, and gain circuit 35. Latch control circuit 36 can control the latch timing of latch circuit 34, in order to further improve the control accuracy. For example, latch control circuit 36 can control the latch circuit to operate when the freewheeling duration time is greater than a reference time for the first time after the flyback converter is powered up. Freewheeling duration time $T_{DIS}$ is a duration time in which the drain voltage of the transistor is less than a freewheeling threshold value. Latch control circuit 36 can also control latch circuit 34 to operate each time when the secondary-side rectifier switch switches from OFF to ON.

In this particular example, latch control circuit 36 can control latch circuit 34 to operate according to the signal at set terminal S of RS flip-flop RS1 in logic circuit LG. For the first latch operation after the flyback converter is powered up, latch control circuit 36 may determine if the previous fall was caused by the turn off of primary-side main power switch $M_1$ according to the duration time in which secondary-side detection voltage $V_{D\_SEC}$ is less than the freewheeling threshold value. The voltage drop of the secondary winding can be caused by the resonance at the primary side, and drain voltage $V_{D\_SEC}$ of secondary-side rectifier switch $M_2$ may be less than zero volts for a very short time and can be oscillated back to be higher than zero volts relatively quickly. If the voltage drop of the secondary winding is caused by the turn off of the main power switch at the primary side, drain voltage $V_{D\_SEC}$ of secondary-side rectifier switch $M_2$ may be less than zero for a relatively long time. In this way, the latch timing of the latch circuit can be controlled.

For example, latch control circuit 36 can include comparator CMP6, OR-gate OR1, control switch K4, current source A2, capacitor C3, capacitor CMP7, pulse generator OS4, OR-gate OR2, and RS flip-flop RS2. Comparator CMP6 can compare secondary-side detection voltage $V_{D\_SEC}$ and freewheeling threshold value $V_{DIS\_TH}$, and may generate a comparison signal. In this particular example, freewheeling threshold value $V_{DIS\_TH}$ can be zero. OR-gate OR1 can receive the comparison signal and status signal $V_{ST}$, and may generate control signal V3. Status signal $V_{ST}$ can represent if the initial value of the change threshold value is latched or not. Control switch K4, current source A2, and capacitor C3 can connect in parallel between timing output terminal "b" and ground. Comparator CMP7 can compare a voltage at timing output terminal "b" that represents freewheeling time $T_{D1}$ against voltage $V_{SR\_REF}$ that represents reference time $T_{SR\_REF}$, and may provide another comparison signal. Pulse generator OS2 can generate a pulse signal in response to the rising edge or falling edge of this comparison signal. The rising edge or falling edge may be determined by the connection relationship of input signals of comparator CMP6. OR-gate OR2 may have an input terminal coupled to pulse generator OS2, and an input terminal for receiving a set signal of the switching control signal.

Figure 9:
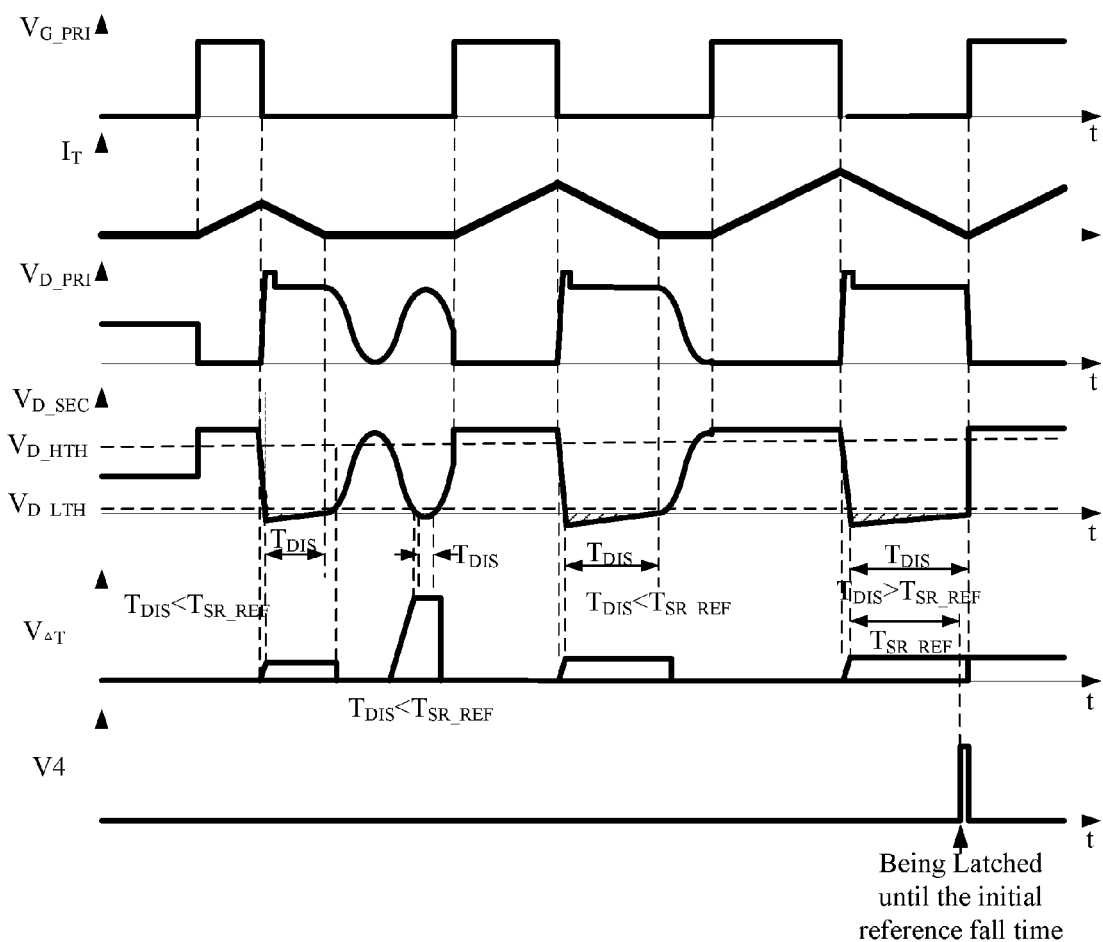
FIG. 9 is a waveform diagram of example operation of the secondary-side control circuit of FIG. 8, in accordance with embodiments of the present invention.

Referring now to FIG. 9, shown is a waveform diagram of example operation of the secondary-side control circuit of FIG. 8, in accordance with embodiments of the present invention. After the flyback converter is powered up, the transformer is energized, and a transformer current $I_T$ rises and falls with the turn on and off of the main power switch at the primary side. In this example, the curve diagram of the transformer current can include a primary-side current during the ON state of the main power switch in ON state, and a converted secondary-side current during the OFF state of the main power switch. The initial state of status signal $V_{ST}$ generated by RS flip-flop RS2 is low, and comparator CMP6 can output a low level when secondary-side detection voltage $V_{D\_SEC}$ is less than freewheeling threshold value $V_{DIS\_TH}$. Thus, OR-gate OR2 can continue to output a low level during the period when secondary-side detection voltage $V_{D\_SEC}$ is less than freewheeling threshold value $V_{DIS\_TH}$, and control switch K4 remains off. Current source A2 can continue charging capacitor C3, such that the voltage at timing output terminal "b" rises with the duration time in which secondary-side detection voltage $V_{D\_SEC}$ is less than freewheeling threshold value $V_{DIS\_TH}$.

When secondary-side detection voltage $V_{D\_SEC}$ is greater than freewheeling threshold value $V_{DIS\_TH}$, comparator CMP6 can output a high level, OR-gate OR2 may output a high level, control switch K4 can be turned on, and capacitor C3 may be reset. After the flyback converter is powered up, the latch control circuit can repeat the above operation until the time duration in which secondary-side detection voltage $V_{DIS\_SEC}$ s less than freewheeling threshold value $V_{DIS\_TH}$ (e.g., zero volts) is large enough to make the voltage at timing output terminal "b" greater than voltage $V_{SR\_REF}$ that indicates reference time $T_{SR\_REF}$. Comparator CMP7 can output high level. Pulse generator OS4 may output pulse V4 in response to the rising edge, such that the high level pulse generated by OR-gate OR3 can control latch circuit 34 to latch for the first time after the flyback converter is powered up, thereby setting the initial value of the change threshold value.

Referring also to FIG. 8 in conjunction with FIG. 9, the set terminal of RS flip-flop RS2 can connect to the output of pulse generator OS4, the reset terminal can connect to ground, and the output terminal may generate status signal $V_{ST}$. After pulse generator OS4 outputs a pulse for the first time, RS flip-flop RS2 can be set, and status signal $V_{ST}$ may transition from low to high in order to indicate that the first latch operation is complete. Since status signal $V_{ST}$ may remain high, control switch K4 can remain on, and the output of pulse generator OS2 can remain low. The output of OR-gate OR2 may be related to the other input (e.g., the set signal of the switching control signal). Thus, after the first latch operation is completed, latch control circuit 36 can control latch circuit 34 to operate each time when secondary-side rectifier switch M2 is turned on, in order to provide the change threshold value for determining the next conduction.

Figure 10:
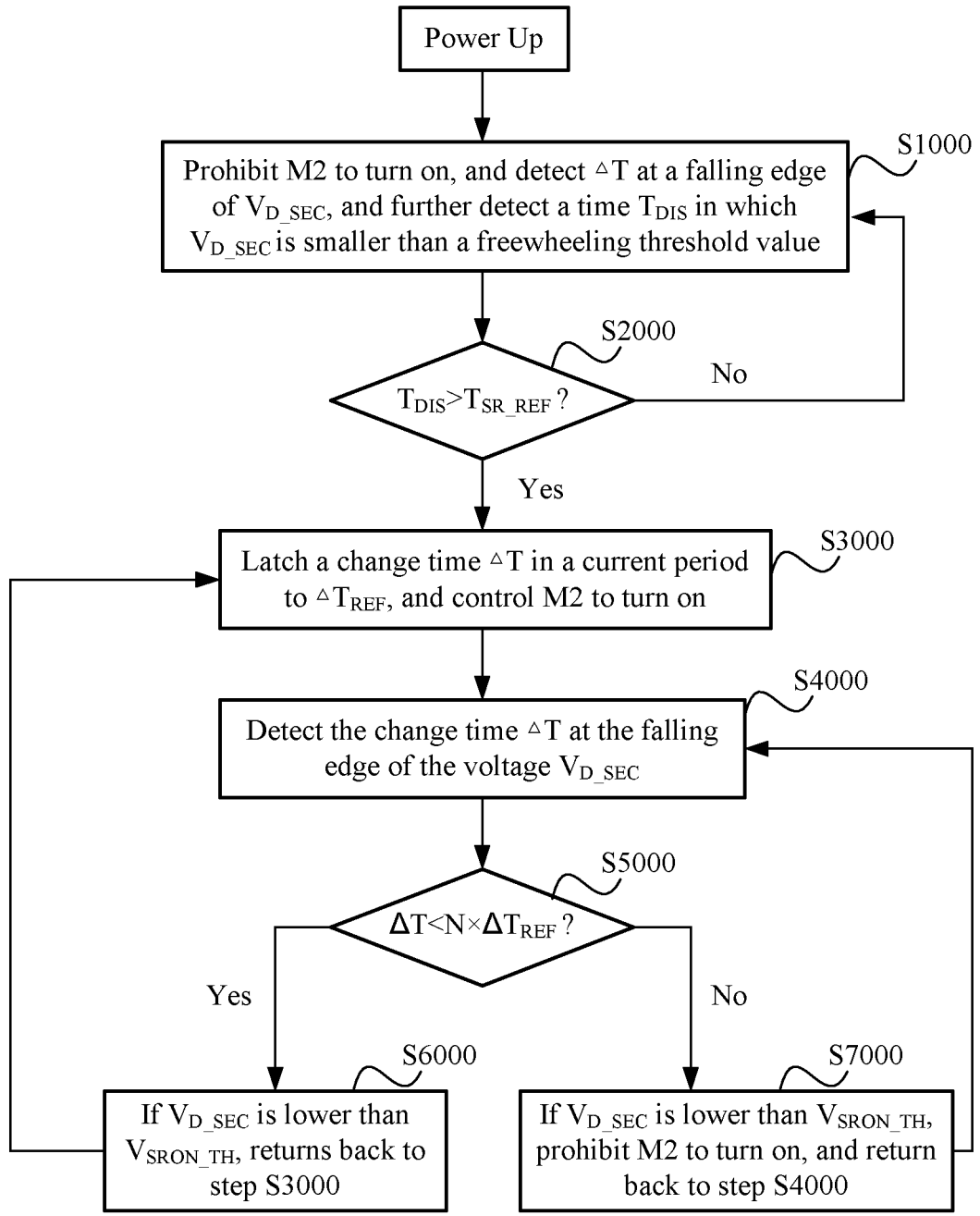
FIG. 10 is a flow diagram of example operation of the secondary-side control circuit of FIG. 8, in accordance with embodiments of the present invention.

Referring now to FIG. 10, shown is a flow diagram of example operation of the secondary-side control circuit of FIG. 8, in accordance with embodiments of the present invention. After the flyback converter is powered up, at S1000, secondary-side control circuit 3 may prohibit secondary-side rectifier switch M2 from turning on, and can detect the change time ΔT at the falling edge of the secondary-side detection voltage $V_{D\_SEC}$. Secondary-side control circuit 3 can also detect duration time $T_{DIS}$ in which secondary-side detection voltage $V_{D\_SEC}$ is less than the freewheeling threshold value after the falling edge. During this time duration, the rectification at the secondary side may be realized by a body diode of the secondary-side rectifier switch. When the freewheeling at the secondary side is started, the body diode can be turned on, such that drain voltage $V_{D\_SEC}$ goes negative. At S2000, it can be determined if duration time $T_{DIS}$ is greater than reference time $T_{SR\_REF}$. If yes, the flow can proceed to S1000, and if not the flow can proceed to S3000.

If secondary-side detection voltage $V_{D\_SEC}$ goes negative and the duration time exceeds reference time $T_{SR\_REF}$, the latch control circuit may generate a pulse signal when reference time $T_{SR\_REF}$ has elapsed, in order to latch detected change time signal $V_{\Delta T}$ and to generate the change threshold signal. Otherwise, if secondary-side detection voltage $V_{D\_SEC}$ may go negative and the duration time can be relatively short to be less than reference time $T_{SR\_REF}$, and the control circuit may neglect the previously detected change time signal.

At S3000, change time ΔT can be latched in the current period to $\Delta T_{REF}$, and secondary-side rectifier switch M2 can be controlled to turn on. At S4000, change time ΔT can be latched at the falling edge of voltage $V_{D\_SEC}$. At S5000, it can be determined if change time ΔT is less than fall time threshold value $\Delta T\_TH = N*\Delta T_{REF}$. If yes, the flow can proceed to S6000, and if not the flow can proceed to S7000. At S6000, when the secondary-side detection voltage $V_{D\_SEC}$ is less than ON threshold value $V_{SRON\_TH}$, the flow can return back to S3000. At S7000, when secondary-side detection voltage $V_{D\_SEC}$ is less than ON threshold value $V_{SRON\_TH}$, secondary-side rectifier switch $M_2$ can be prohibited from turning on, and the flow can return back to S4000.

In this way, after the flyback converter is powered up, rectification by the body diode of the secondary-side rectifier switch can occur, and it can be determined if the currently detected falling edge is caused by the turn off of the main power switch at the primary side and if the circuit enters into the steady state on the basis of the duration time of the secondary-side detection voltage. The first latch operation may be carried out only when the circuit enters into the steady state and the currently detected falling edge is caused by the turn off of the main power switch at the primary side, in order to obtain the initial value of the change threshold value. This can improve the control accuracy of the circuit, and may guarantee that the circuit operates steadily after being powered up.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for controlling a secondary-side rectifier switch of a flyback converter, the control circuit comprising:
   a) a change time detection circuit configured to detect a change time during which a secondary-side detection voltage changes from a first to a second threshold value along a predetermined direction, and to generate a change time signal that represents said change time, wherein said secondary-side detection voltage is configured to represent a voltage across a secondary winding of said flyback converter; and
   b) a switch control signal generator configured to generate a switching control signal to control said secondary-side rectifier switch to turn on when said change time signal is less than a fall time threshold represented by a change threshold, and a relationship between said secondary-side detection voltage and an ON threshold value meets a predetermined requirement.

2. The control circuit of claim 1, wherein said switch control signal generator comprises:
   a) a first comparator configured to compare a change threshold value against said change time signal, and to generate a first comparison signal;

b) a second comparator configured to compare an ON threshold value against said secondary-side detection voltage, and to generate a second comparison signal; and c) a logic circuit configured to generate said switching control signal to control said secondary-side rectifier switch to turn on when said first comparison signal indicates said change time signal is less than said change threshold value, and said second comparison signal indicates said relationship between said secondary-side detection voltage and said ON threshold value meets said predetermined requirement.

3. The control circuit of claim 1, wherein:
a) said change threshold value is an amplification signal N times a previous valid change time signal, and N is greater than 1 and less than 5; and
b) said previous valid change time signal is a change time signal which is previously detected and is used to turn on said secondary-side rectifier switch when activated.

4. The control circuit of claim 3, wherein said secondary-side control circuit further comprises:
a) a latch circuit coupled to said change time detection circuit, and being configured to latch said previous valid change time signal; and
b) a gain circuit coupled to said latch circuit, and being configured to generate said amplification signal.

5. The control circuit of claim 4, wherein said latch circuit comprises:
a) a second capacitor coupled between an output terminal of said latch circuit and ground; and
b) a third control switch coupled between said output terminal of said latch circuit and an output terminal of said change time detection circuit, and being configured to control when said secondary-side rectifier switch is switched from OFF to ON.

6. The control circuit of claim 4, wherein said secondary-side control circuit further comprises:
a) a latch control circuit configured to control said latch circuit to operate when said freewheeling duration time is detected to be greater than a reference time for the first time after being powered up, and to control said latch circuit to operate each time when said secondary-side rectifier switch is switched from OFF to ON; and
b) said freewheeling duration time is a time duration in which said secondary-side detection voltage is less than a freewheeling threshold value.

7. The control circuit of claim 6, wherein said latch control circuit comprises:
a) a third comparator configured to compare said secondary-side detection voltage against said freewheeling threshold value, and to generate a third comparison signal;
b) a first OR-gate configured to receive said third comparison signal and a status signal, and to generate a third control signal, wherein said status signal represents whether an initial value of said change threshold value is latched;
c) a fourth control switch, a current source, and a third capacitor coupled in parallel between a timing output terminal and ground;
d) a fourth comparator configured to compare a voltage at said timing output terminal and a voltage representing said reference time, and to generate a fourth comparison signal;
e) a fourth pulse generator configured to generate a pulse signal in response to a rising edge or a falling edge of said fourth comparison signal;

f) a second OR-gate having a first input terminal coupled to said fourth pulse generator, and a second input terminal coupled to a set signal of said switching control signal; and
g) a second RS flip-flop having a set terminal coupled to said fourth pulse generator, a reset terminal coupled to ground, and an output terminal configured to generate said status signal.

8. The control circuit of claim 1, wherein:
a) said secondary-side rectifier switch is a transistor, and said secondary-side detection voltage is a drain voltage of said transistor;
b) said change time detection circuit comprises a timing and reset circuit configured to activate a first control signal when said secondary-side detection voltage falls from said first to said second threshold value, and to activate a second control signal before said secondary-side detection voltage falls to said first threshold value again; and
c) said change time detection circuit comprises a signal conversion circuit configured to generate a voltage signal proportional to an active time of said first control signal as said change time signal, and to reset said voltage signal when said second control signal is activated.

9. The control circuit of claim 8, wherein said timing and reset circuit is configured to activate said second control signal after a predetermined delay when at least one of: said secondary-side detection voltage is less than said second threshold value, said secondary-side detection voltage increases to be greater than said second threshold value, and said secondary-side detection voltage increases to be greater than said first threshold value.

10. The control circuit of claim 9, wherein said timing and reset circuit comprises:
a) a third comparator configured to generate a third comparison signal with triggering edges when said secondary-side detection voltage falls to be less than said first threshold value;
b) a first pulse generator configured to generate a first triggering pulse according to said triggering edges of said third comparison signal;
c) a fourth comparator configured to generate a fourth comparison signal with triggering edges when said secondary-side detection voltage falls to be less than said second threshold value;
d) a second pulse generator configured to generate a second triggering pulse according to said triggering edges of said fourth comparison signal;
e) a first RS flip-flop having a set terminal coupled to said first pulse generator, a reset terminal coupled to said second pulse generator, and an output terminal configured to generate said first control signal;
f) a fifth comparator configured to generate a fifth comparison signal with triggering edges when said secondary-side detection voltage rises to be greater than said second threshold value; and
g) a third pulse generator configured to activate said second control signal according to said triggering edges of said fifth comparison signal.

11. The control circuit of claim 8, wherein said signal conversion circuit comprises:
a) a first current source and a first control switch coupled in series between a supply terminal and an intermediate terminal, wherein said first control switch is controlled by said first control signal;

b) a first capacitor and a second control switch coupled in parallel between said intermediate terminal and ground, wherein said second control switch is controlled by said second control signal; and c) a voltage controlled current source configured to generate an output voltage proportional to a voltage across said first capacitor.

12. A power converter comprising the secondary-side control circuit of claim 1, and further comprising:

a) a power stage circuit in a flyback configuration, said power stage circuit having a main power switch coupled between a primary winding of a transformer and a ground terminal;

b) said secondary-side rectifier switch being coupled between a secondary winding of said transformer and said ground terminal; and c) a primary-side control circuit for controlling said main power switch.

13. A method of controlling a secondary-side rectifier switch of a flyback converter, the method comprising:

a) detecting a change time during which a secondary-side detection voltage changes from a first to a second threshold value along a predetermined direction, wherein said secondary-side detection voltage is configured to represent a voltage across a secondary winding of said flyback converter; and b) controlling said secondary-side rectifier switch to turn on when said change time is less than a fall time threshold, and a relationship between said secondary-side detection voltage and said ON threshold meets a predetermined requirement.

14. The method of claim 13, wherein a change threshold value for representing said fall time threshold is a predetermined fixed value.

15. The method of claim 13, wherein a change threshold value for representing said fall time threshold is an amplification signal N times a previous valid change time signal, said N is greater than 1 and less than 5, said previous valid change time signal is a change time signal that was previously detected and is used to turn on said secondary-side rectifier switch when activated, and said change time signal is configured to represent said change time.

16. The method of claim 15, wherein:

a) said secondary-side rectifier switch is a transistor, and said secondary-side detection voltage is a drain voltage of said transistor;

b) an initial value of said change threshold value is obtained according to a change time signal corresponding to a freewheeling duration time being greater than a reference time; and c) said freewheeling duration time is a time duration during which a drain voltage of said transistor is less than a freewheeling threshold value.

* * * * *